Patented July 10, 1951

2,559,754

UNITED STATES PATENT OFFICE 2,559,754

FLUOROALKANEPHOSPHONIC COMPOUNDS

James Arthur Bittles, Jr., and Robert M. Joyce, Jr., Wilmington, Del., assignors to E. I. du Pont de Nemours & Company, Wilmington, Del., a corporation of Delaware No Drawing. Application June 29, 1950, Serial No. 171,243

7 Claims. (Cl. 260—500)

This invention relates to a new class of organic phosphorus compounds. More particularly, it relates to a new class of highly fluorinated phosphonic acids and esters and salts thereof, and to a method of preparing them.

Organic phosphorus compounds are useful in a number of technological applications, for example, as plasticizers, flameproofing agents for textiles, oil additives, water repellents, antioxidants, etc. Alkanephosphonic acids and esters in particular are valuable for these and other uses because of their great chemical stability. These compounds are relatively little known. Even less is known of haloalkanephosphonic acids, and there is no information at all on fluoroalkanephosphonic acids wherein all carbon atoms bear fluorine atoms.

An object of the present invention is to provide a new class of organic phosphorus compounds. A more particular object is to provide a class of fluoroalkanephosphonic acids and esters and salts thereof useful in various technological applications. Other objects will be apparent from the description of the invention given hereinafter.

The above objects are accomplished according to the present invention by providing, as a new class of compounds, the fluoroalkanephosphonic acids having an even number, at least equal to 2, of carbon atoms and wherein all carbon atoms bear two fluorine atoms, the terminal carbon bearing in addition a hydrogen atom, and the salts and esters of these acids. These fluoroalkanephosphonic acids have the general formula $H(CF_2-CF_2)_nPO(OH)_2$ wherein $n$ is an integer at least equal to 1.

These compounds are prepared by reacting tetrafluoroethylene with a dialkyl phosphite, e. g. diethyl or dibutyl phosphite, in the presence of a free radical-producing catalyst or initiator. The reaction product comprises a mixture of alkyl fluoroalkane phosphonates, formed according to the equation:

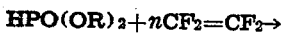
$$HPO(OR)_2 + nCF_2=CF_2 \rightarrow$$
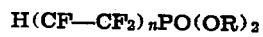
$$H(CF_2-CF_2)_nPO(OR)_2$$

The resulting esters, with or without separation into individual fractions, can then be hydrolyzed to the corresponding fluoroalkanephosphonic acids by treatment with a strong acid.

The invention is illustrated in greater detail by the following examples, in which all parts are by weight unless otherwise stated.

Example I

A mixture of 104 parts of diethyl phosphite, 50 parts of tetrafluoroethylene, and 1.5 parts of benzoyl peroxide as the initiator, were charged into a rocking autoclave and heated at 90° C. for eight hours. The excess diethyl phosphite and unchanged tetrafluoroethylene were removed from the reaction mixture by distillation at 20 mm. pressure and the non-volatile residue (25 parts) was extracted with hot absolute ethanol. An insoluble portion (4.5 parts) was filtered off and the ethanol solution was evaporated to dryness, yielding 20 parts of a semi-solid mixture of diethyl polyfluoroalkanephosphonates having an average of about six carbon atoms.

These products are also obtained, with about the same yield, by heating tetrafluoroethylene with diethyl phosphite in the presence of di-tert. butyl peroxide as the catalyst at 140° C. for eight hours.

Hydrolysis to the phosphonic acids was carried out as follows: a mixture of 60 parts of diethyl polyfluoroalkanephosphonates averaging six to eight carbon atoms per molecule, i. e., having the formula $H(CF_2-CF_2)_nPO(OC_2H_5)_2$, wherein $n$ averages 3 to 4, with 370 parts of concentrated sulfuric acid, was heated at 100° C. for two hours, filtered to remove the unhydrolyzed material, and the filtrate almost completely neutralized with aqueous potassium hydroxide, keeping the pH below 7.0. A solid mixture of potassium sulfate and fluoroalkanephosponic acids separated and this was filtered, dried, and extracted with absolute ethanol. The ethanol solution was dried by azeotropic distillation with benzene and evaporated at reduced pressure, leaving a viscous liquid consisting of a mixture of fluoroalkanephosphonic acids. From this liquid crystallized 2 parts of solid acid having a neutralization equivalent (both hydroxyls) of 370, indicating an average of twelve to fourteen difluoromethylene groups in the molecule. The remaining liquid (34 parts) has a neutralization equivalent (both hydroxyls) of 183, indicating an average of six difluoromethylene groups per molecule. The mixture of fluoroalkane phosponic acids was highly surface-active, giving strongly foaming solutions in both acid and basic aqueous media.

Example II

A mixture of 100 parts of diethyl phosphite, 25 parts of tetrafluoroethylene, and 2 parts of disuccinoyl peroxide, was heated in a rocking autoclave at 60° C. for four hours. The reaction product was filtered to remove about 1 part of solid material, then distilled at 2 mm. pressure to remove the excess diethyl phosphite. There was obtained as the non-distillable residue 16 parts of a semi-solid mixture of diethyl fluoroalkanephosphonates averaging about eight carbons per molecule. Such a mixture can be separated, if desired, into relatively homogeneous fractions of varying chain length. For example, diethyl octafluorobutanephosphonate,

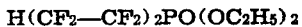

can be isolated by distillation, showing, by analysis, 9.51% phosphorus and 43.2% fluorine, as compared with the calculated values of 9.15% phosphorus and 45% fluorine.

The above mixture (16 parts) was heated at 105° C. for three hours with 90 parts of concentrated sulfuric acid. The reaction mixture was then diluted with about 400 parts of water and the resulting solution was extracted continuously with ether for sixteen hours. Evaporation of the ether solution yielded 8 parts of a mixture of fluoroalkanephosphonic acids having a neutralization equivalent (both hydroxyls) of 255, indicating that the mixture had the average composition $H(CF_2—CF_2)_4PO(OH)_2$, since this formula corresponds to a neutralization equivalent of 241.

Example III

A mixture of 100 parts of diethyl phosphite, 25 parts of tetrafluoroethylene, and 2 parts of alpha,alpha'-azodiisobutyronitrile, was heated in a rocking autoclave for four hours at 90° C. The reaction product was filtered to remove about 1 part of solid material, then distilled at reduced pressure to remove the excess diethyl phosphite. There was obtained 14 parts of a nonvolatile, semi-solid mixture of diethyl fluoroalkanephosphonates. The ester was hydrolyzed to the free phosphonic acid as in Example II. The phosphonic acids in the mixture contained an average of ten difluoromethylene groups. These acids can be converted to alkali metal salts by dissolving them in a solution of the appropriate alkali hydroxide and evaporating the solution. Calcium salts of the mixed acids were prepared by treating an aqueous solution of the mixed acids with calcium chloride, which precipitates the calcium fluoroalkanephosphonates.

It will be understood the above examples are merely illustrative and that the present invention broadly comprises the fluoroalkanephosphonic acids having an even number, at least equal to 2, of carbon atoms and wherein all carbon atoms bear two fluorine atoms, the terminal carbon bearing in addition a hydrogen atom, and the salts and esters of these acids.

Stated alternatively, the invention comprises the esters and salts, as well as the acids themselves, of the fluoroalkanephosphonic acids of the general formula $H(CF_2—CF_2)_nPO(OH)_2$ wherein $n$ is an integer at least equal to 1. These products are in general obtained as mixtures wherein $n$ varies from 1 to 12. The various fractions can be separated, for example by molecular distillation, or by fractional crystallization from appropriate solvents but this is in general unnecessary for the uses to which these products may be put. The fluoroalkanephosphonic acids vary from viscous liquids to relatively high-melting solids, depending upon their molecular weight. They are soluble in water, acids, and bases, and in many organic solvents. The most accessible and the most generally useful fluoroalkanephosphonic acids are those in which $n$ in the above formula is an integer from 3 to 9, inclusive, and, even more desirably, from 3 to 6. Products within this range have outstanding surface-active properties as shown hereinafter. The stability of fluoroalkanephosphonic acids in acidic solutions makes them particularly useful in dispersion polymerization systems which are on the acid side.

The invention also includes the metal, ammonium and substituted ammonium salts, including acid salts (i. e., the half-salts having a free hydroxyl group), of the fluoroalkanephosphonic acids, which can be prepared by neutralizing the acid with the desired base and, if desired, isolating the salt. Among such salts are the sodium, potassium, silver, calcium, zinc, barium, lead and ammonium salts and the amine salts, e. g., with aliphatic amines of one to six carbons such as methylamine, ethylamine, butylamine, hexylamine, cyclohexylamine, dimethylamine and the like. The water-soluble salts of fluoroalkanephosphonic acids of six to eighteen carbons, i. e., the alkali metal or ammonium salts, are particularly useful as surface-active agents.

The invention includes also the esters of fluoroalkanephosphonic acids with alcohols, particularly alkanols of one to six carbon atoms, e. g., the dimethyl, diethyl di-n-butyl, di-n-hexyl or dicyclohexyl esters. These esters are obtained as the primary products in the reaction of tetrafluoroethylene with dialkyl phosphites.

In the preparation of these compounds there can be used as catalyst or initiator a compound yielding a free radical under the reaction conditions e. g., a compound of the formula RXXR where XX is —N=N— or —O—O—. The preferred catalysts are the organic peroxygen compounds, among which may be mentioned diacetyl peroxide, tertiary-butyl hydroperoxide, ditertiary-amyl peroxide, tertiary-butyl-1-methylcyclohexyl peroxide, di-lauroyl peroxide and the like. Another preferred class of catalysts comprises the azonitriles described in U. S. Patent 2,471,959, examples of which are alpha,alpha'-azobis(alpha - methyl - butyronitrile), alpha,alpha' - azobis(alpha,gamma - dimethylvaleronitrile), alpha,alpha' - azobis(alpha,gamma - dimethylcapronitrile), 1,1'-azodicyclopentanecarbonitrile, alpha,alpha' - azobis(alpha - methyl-beta-phenylpropionitrile), and the like. The catalyst is preferably used in amounts of 0.005 to 0.1 mole per mole of tetrafluoroethylene.

Any alkyl or cycloalkyl ester of phosphorous acid may be used in the reaction with tetrafluoroethylene but, for reasons of economy and good results, it is preferred to use the alkyl and cycloalkyl esters in which the alcohol group has one to six carbons, e. g., the dimethyl, diethyl, dipropyl, di-n-butyl, diisobutyl, di-n-hexyl, dicyclohexyl esters and the like. The dialkyl phosphite is preferably used in excess, e. g., from 1.5 to 3 moles per mole of tetrafluoroethylene, but this is not essential. The reaction between the tetrafluoroethylene and the dialkyl phosphite is preferably carried out within the temperature range of 30° C. to 200° C., the preferred range being from 50° C. to 150° C.

Hydrolysis of the dialkyl fluorophosphonates to the free phosphonic acids is preferably carried out in strongly acidic aqueous media such as sulfuric acid (20–98% concentration), concentrated hydrochloric acid, 85% phosphoric acid and the like. As already noted, the fluoroalkanephosphonic acids are remarkably stable in acidic solutions. The fluoroalkanephosphonic acids can be separated from the hydrolysis mixture by any suitable means, of which perhaps the most convenient is extraction with a water-immiscible solvent.

The polyfluoroalkanephosphonic acids have the unique property of being soluble and stable in strong acids such as 20% sulfuric acid, 98% sulfuric acid, or nitric acid-hydrofluoric acid mixtures. For example, a solution of 1 part of the liquid fluoroalkanephosphonic acid mixture of Example I (neutralization equivalent 183) in 25 parts of a 16% nitric acid-4% hydrofluoric acid mixture was highly surface-active, as shown by its strong tendency to foam. This solution was heated at 100° C. for nine hours without destroying its foaming ability. When 1 part of steel wool was dropped into the solution, reaction with the steel occurred immediately but ceased after a few minutes and the remaining steel wool was unattacked, thus showing the value of fluoroalkanephosphonic acids as pickling bath ingredients.

Fluoroalkanephosphonic acids of the formula $H(CF_2-CF_2)_nPO(OH)_2$ in which $n$ has an average value from 3 to 9, inclusive, are excellent dispersing agents, particularly suitable for use in the preparation of polymer dispersions by direct polymerization of ethylenic monomers in aqueous systems. This is shown by the following:

A. A mixture of 100 parts of distilled water, 10 parts of freshly distilled acrylonitrile, 0.5 part of a mixture of fluoroalkanephosphonic acids having the average composition of hexadecafluorooctanephosphonic acid, $H(CF_2-CF_2)_4PO(OH)_2$, and 0.1 part of uranyl nitrate, was placed under nitrogen in a glass vessel transparent to ultraviolet light. The mixture was stirred at 20–25° C. for five hours while being kept under nitrogen and while being irradiated by means of two 15-watt fluorescent bulbs placed at about 3 inches from the vessel. At the end of the reaction time the flask contained a uniform milky white dispersion of polyacrylonitrile;

B. A 0.5% solution of a mixture having the average composition of hexadecafluorooctanephosphonic acid in 146 parts of water, 0.04 part of potassium persulfate, and 45 parts of vinyl chloride, were charged into a stainless steel bomb having a volume capacity of 500 parts of water. The bomb was heated at 65° C. for 10 hours with agitation. The reaction product was a milky, fluid dispersion of polyvinyl chloride in water, containing 22.8% solids (90% yield). The dispersion remained stable on further agitation.

In addition to their already noted utility as pickling bath addition agents and dispersing agents, the fluoroalkanephosphonic acids of this invention and their salts are useful as addition agents for electroplating baths, bactericides, insecticides, flameproofing agents and additives, oil additives, plasticizers, antioxidants, etc.

As many apparently widely different embodiments of this invention may be made without departing from the spirit and scope thereof, it is to be understood that the invention is not limited to the specific embodiments thereof except as defined in the appended claims.

The invention claimed is:

1. A fluoroalkanephosphonic compound from the group consisting of the fluoroalkanephosphonic acids having the general formula $$H(CF_2-CF_2)_nPO(OH)_2$$

wherein $n$ is an integer at least equal to 1, the salts of said acids, and the esters of said acids with alkyl and cycloalkyl alcohols of 1 to 6 carbon atoms, inclusive.

2. A fluoroalkanephosphonic compound from the group consisting of the fluoroalkanephosphonic acids having the general formula $$H(CF_2-CF_2)_nPO(OH)_2$$

wherein $n$ is an integer from 1 to 12, inclusive, the salts of said acids, and the esters of said acids with alkyl and cycloalkyl alcohols of 1 to 6 carbon atoms, inclusive.

3. A fluoroalkanephosphonic acid having the general formula $H(CF_2-CF_2)_nPO(OH)_2$ wherein $n$ is an integer at least equal to 1.

4. A fluoroalkanephosphonic acid having the general formula $H(CF_2-CF_2)_nPO(OH)_2$ wherein $n$ is an integer from 1 to 12, inclusive.

5. A fluoroalkanephosphonic acid having the general formula $H(CF_2-CF_2)_nPO(OH)_2$ wherein $n$ is an integer from 3 to 9, inclusive.

6. A fluoroalkanephosphonic acid having the general formula $H(CF_2-CF_2)_nPO(OH)_2$ wherein $n$ is an integer from 3 to 6, inclusive.

7. Diethyl octafluorobutanephosphonate.

JAMES ARTHUR BITTLES, JR.
ROBERT M. JOYCE, JR.

No references cited.

Certificate of Correction

Patent No. 2,559,754                                                July 10, 1951

JAMES ARTHUR BITTLES, Jr., ET AL.

It is hereby certified that error appears in the printed specification of the above numbered patent requiring correction as follows:

Column 1, line 46, for that portion of the formula reading "$H(CF\text{---}CF_2)$" read $H(CF_2\text{---}CF_2)$; column 2, line 47, for the word "has" read *had*;

and that the said Letters Patent should be read as corrected above, so that the same may conform to the record of the case in the Patent Office.

Signed and sealed this 4th day of September, A. D. 1951.

[SEAL]

THOMAS F. MURPHY,
*Assistant Commissioner of Patents.*